United States Patent

[11] 3,615,697

| [72] | Inventor | Clifford M. Hollenbeck<br>Manitowoc, Wis. |
|---|---|---|
| [21] | Appl. No. | 771,662 |
| [22] | Filed | Oct. 29, 1968 |
| [45] | Patented | Oct. 26, 1971 |
| [73] | Assignee | Red Arrow Products Company<br>Milwaukee, Wis. |

[54] LACTIC FERMENTED MALT PRODUCT AND PROCESS OF PRODUCING SAME
17 Claims, No Drawings

[52] U.S. Cl. .................................................. 99/140 R,
  99/93
[51] Int. Cl. .................................................. A23l 1/22,
  A21d 2/26
[50] Field of Search ........................................... 99/53, 57,
  58, 59, 90, 93, 94, 140

[56] References Cited
UNITED STATES PATENTS

| 579,739 | 3/1897 | Clowes ........................ | 99/90 |
|---|---|---|---|
| 1,041,896 | 10/1912 | Stillwell ....................... | 99/57 |
| 2,060,264 | 11/1936 | Swift ........................... | 99/90 |
| 2,322,940 | 6/1943 | Kirby et al. ................... | 99/91 |
| 2,857,280 | 10/1958 | Williams et al. .............. | 99/92 |

*Primary Examiner*—Morris O. Wolk
*Assistant Examiner*—Warren Bovee
*Attorney*—Merriam, Marshall, Shapiro & Klose

ABSTRACT: A dry powdered additive for supplying malt flavor and lactic sourness to starch based foodstuffs is produced by anaerobically fermenting an aqueous dispersion of malt flour, advisably in whey, with a lactic acid producing micro-organism, removing the water, and grinding the product to a flour.

LACTIC FERMENTED MALT PRODUCT AND PROCESS OF PRODUCING SAME

This invention relates to foodstuffs. More particularly, this invention is concerned with a lactic acid containing, fermented, nutritious, and flavorsome malt food additive for incorporation in consumer food items, particularly those of the starch-based baked types.

Two of the highly delectable sought after flavors in many baked products such as bread, rolls and cakes, particularly of the coffeecake type, as well as pancakes and breakfast foods, are the sour taste and flavor of lactic acid and related fermentation-produced flavoring substances normally associated with it, and that of malt. To achieve these sought-for flavors, many proposals have been made in the prior art and some of these have been acceptable, although the flavors have not been fully satisfactory and readily controllable when produced in the sought-for strength. Furthermore, most of the prior art processes comprised separate additives for the two flavors, were unduly complicated and involved cost factors which restricted use of the resulting products. Many of the prior art flavor additives are also unsuitable for extended storage, and loss or alteration of flavor, as a result, was quite common.

According to the present invention there is provided a lactic fermentation flavored malt product for incorporation in foodstuffs, particularly those which are starch based and baked. The product is of the additive or supplement type, providing both the lactic sourness flavor and the sweet malt flavor in such ultimate foodstuffs by the addition of small amounts of product thereto. Usually a maximum of 5 percent by weight of the additive is adequate to impart the desired flavor characteristics to the ultimate foodstuff.

The additive provided herewith can be described broadly as malt flour fermented by a lactic acid producing micro-organism. The resulting product is dried, since it can be handled easier in this form. Also the increased malty flavors developed during the drying are very desirable.

The food additive of this invention broadly can be produced by fermenting an aqueous mixture of malt flour with a lactic acid producing micro-organism. The fermentation is readily effected by combining malt flour, an aqueous medium and a suitable lactic acid-forming bacteria and subjecting the resulting mixture to appropriate conditions to effect and promote the fermentation to yield a fermentation product rich in lactic acid and closely associated fermentation products. The resulting product is dried to develop flavor and to form a powder or flour and used in such form. Malt flour is unique in this invention providing both fermentable sugars for the production of the lactic sourness and the malt flavors which are highly supplementary to the lactic sourness.

The amount of water used per weight of malt flour can be varied considerably. Generally about 0.5 to 2 parts by weight of water is used for each part by weight of malt flour in producing the fermentable mixture. However, a ratio of ingredients is advisably employed such that the mixture forms a batter which is not unduly thin or excessively heavy or thick, but which permits and facilitates the subsequent fermentation of the lactic acid-producing micro-organism used in the inoculation thereof. Batters of approximately the optimum consistency employ about one part by weight of malt flour to about 0.8 to 1.5 parts by weight of water.

Any suitable lactic acid-producing micro-organism can be used in practicing the invention. Some of those which may be employed are *Lactobacillus acidophilus, Streptococcus lactis, Pediococcus cerevisiae, Lactobacillus delbreuckii, Lactobacillus plantarum* and other lactic acid-producing micro-organisms. In addition, bacteria can be employed which produce in addition to lactic acid other flavoring acids and compounds as well. One such organism is *Streptococcus diacetilactic*, ATCC 11007.

In order to inoculate the mixture of malt flour and water with an appropriate bacteria population to facilitate the fermentation, there is generally employed an inoculum prepared by serial transfer from pure starter culture. Thus, a loopful of the pure micro-organism can be transferred to 10 ml. of trypticase soy broth and incubated for 24 hours at 30° C. The contents of this broth culture can then be transferred to a flask containing one liter of sterilized nutrient media, such as sterilized fresh whey, to which has been added other appropriate materials for bacterial growth. After a suitable period of incubation, such as about 48 hours, the resulting culture material of about one liter quantity can be used to inoculate the mixture of malt flour and water. However, it is more suitable to add the culture to the water and then to add the inoculated water to the malt flour to produce the inoculated admixture. Other appropriate means may be employed to introduce a suitable bacteria population density in the admixture of malt flour and water to achieve the desired fermentation and lactic acid production within a reasonable time. Thus, fresh whey from cheese manufacture, which is rich in lactic acid-producing micro-organisms, can be used directly to inoculate malt flour.

After the admixture has been suitably inoculated with the lactic acid-producing bacteria, the mixture can be brought to an appropriate temperature for inducing and facilitating anaerobic bacterial growth and lactic acid production. Usually the admixture can be maintained at a temperature of about 25° to 40° C. to maintain bacterial growth. However, a temperature of about 30° to 34° C. is usually optimum for the fermentation. Although the fermentation can be terminated at any appropriate time, in order to obtain a high lactic acid content and pronounced flavor the fermentation should generally continue for a minimum of 24 hours, and usually up to 4 to 6 days. As a result of the fermentation, the lactic acid or lactate salt content, as the case may be, can go above 30 percent by weight of the admixture. Generally, the fermentation is continued at least long enough to produce a product having a minimum of 3.5 percent lactic acid by weight and advisably at least 10 percent by weight.

After the fermentation is terminated, the product is subjected to a drying-heating step to reduce the moisture sufficiently far so that the product is dry to the touch. This is usually achieved when the moisture content is brought down to about 10 percent by weight or less. In drying the product the air temperature should desirably be maintained at up to about 110° F. until the product is dry enough to break into pieces to prevent excessive color formation in the product. Subsequently the temperature may be raised up to about 130° F. to complete the drying.

Drying of the product can be accomplished in various ways although spreading the fermented product in a thin layer usually is suitable. By drying the product at temperatures as indicated, a light tan product is obtained, which is slightly darker than malt flour. The colored and flavored ingredients produced during the drying are very desirable components of the finished product. These flavors are unique with malt and for the reason that the combination of the malty flavor with the lactic fermentation flavor, the product of this invention is more than just another lactic or sour flavoring. The product is hygroscopic in character and therefore should be packaged to protect it against high humidities to avoid caking. It usually has a pH range of about 3.3 to 4.3.

In effecting the fermentation, it is usually advantageous to add the malt flour in at least two increments and preferably more. Generally these increments are added daily during the active fermentation.

The acidic conditions created by the production of lactic acid during the fermentation of the malt flour-water admixture retards and subdues the extent and rate of growth and fermentation by the micro-organism. Therefore, it has been found advisable to include a food acceptable buffering agent in the admixture to reduce the acidity of the fermenting medium. An appropriate buffering agent which can be used is calcium carbonate. It can be added in an amount necessary to buffer the admixture but under most conditions that are encountered in practicing this invention, at least 10 percent and a maximum of about 20 percent by weight of calcium carbonate based on the malt flour need be employed. Larger amounts can be used but generally are unnecessary. The buffering agent is advisably added in two or more increments during the fermentation, and this addition is advantageously made with increments of malt flour added to the fermenting product. When such a buffering agent is employed, the lactic acid is converted to a lactate salt. With calcium carbonate as the buffering agent calcium lactate forms.

After the buffered fermentation has been terminated, it is advisable to acidify the buffered fermented product with a food acceptable acid to convert the lactate salt to free lactic acid. The free lactic acid is more highly flavorsome than the lactate salts. A moderately strong to strong acid which will free the lactic acid is employed usually. One of the most suitable acids for effecting the neutralization is phosphoric acid. When this acid is used not only is the lactic acid released, but calcium phosphate is formed and remains in the resulting product. The lactic acid content of the product from a buffered fermentation is generally higher than from an unbuffered fermentation and ranges from 10 percent to 40 percent by weight by colorimetric determination.

To avoid loss of any of the resulting fermentation product the isolation techniques of drying and the like as already described are advisably effected without filtration or other such means for separating the solids from the water other than as a vapor. This is because it is desirable to avoid loss of water soluble nutrients, flavoring agents and salts in such filtrate or separated aqueous supernatant liquid. By subjecting the fermented product to simple drying techniques, no soluble products are lost. The resulting flavorsome product is thus in essence a malt flour fermented with a lactic acid producing micro-organism and contains both the viable and nonviable micro-organism, and whatever salts are naturally present or introduced from the buffering and lactic acid releasing steps.

According to a further aspect of this invention it has been found that the partial or complete replacement of water by whey in the production of the fermented lactic acid containing malt flour product leads to a more strongly flavored and more tasty foodstuff additive than is obtained when plain water is used. By whey is meant that part of the milk which remains after the greater amount of the fat and casein is removed as in cheese making.

The whey can be used in the amounts indicated previously for plain water. Furthermore, since whey is rich is lactic acid-producing micro-organisms, it can generally be admixed with malt flour and the resulting admixture subjected to fermentation conditions without a separate inoculation of the admixture with a lactic acid producing micro-organism. However, if for any reason it is considered that the whey lacks a suitable lactic acid-producing bacterial population, the whey can be inoculated with a lactic acid-producing micro-organism and then combined with the malt flour. Fermentation of the admixture of whey and malt flour can be effected using the previously described conditions for the admixture of plain water and malt flour.

Although the whey can be combined directly with the malt flour and the resulting admixture subjected to fermentation, it is advisable to first subject the whey to a prefermentation since this leads to a resulting food additive of even enhanced flavor and taste characteristics. Whey, such as from cheese manufacture, can be prefermented at a temperature such as about 25° to 40° C., and advisably at about 30° to 35° C., for a period of about 6 to 36 hours. A small amount of dextrose or other easily fermentable sugar may be added to the whey to accelerate the prefermentation. As a result of this prefermentation, the pH of the whey decreases to about 3 to 4. The resulting prefermented whey can then be combined with the malt flour and the fermentation continued. However, the prefermented whey can first be sterilized, then inoculated with an acceptable lactic acid-producing micro-organism, combined with malt flour and fermentation effected. The product which results can be handled as previously indicated for use in giving a malt and lactic acid or sour flavor to foodstuffs. An extra advantage of using whey as the medium is that the product made from whey and malt flour has a desirable dough-softening and conditioning effect, in addition to the flavoring effect, when used in bread dough.

The product provided herewith is a particularly useful additive in obtaining a sour-dough or lactic acid flavor in foodstuffs which are starch based and particularly those of the baked variety such as bread, rolls, buns, coffee cake, pancakes, dried cereals of the ready-to-eat variety and crackers. To obtain the desired sour-dough flavor in such products, the fermented malt flour-lactic acid containing additive can be incorporated therein in any desired amount although generally it is unnecessary to use more than 5 percent by weight based on the final foodstuff, with 2 to 3 percent being adequate under most circumstances. The conventional methods of handling the foodstuffs can be employed when the additive provided herewith is incorporated in the foodstuff. No special handling is required. It can be included in the recipes as considered suitable and convenient at whatever step serves to distribute the additive through the foodstuff being prepared.

The following examples are presented to illustrate the invention:

EXAMPLE 1

An admixture is prepared of 7.8 parts by weight of fresh cheese whey rich in lactic acid-producing bacteria and 10 parts by weight of malt flour except that one-half the malt flour is added 1 day after fermentation is started. The whey-malt flour batter is fermented a total of 2 to 3 days at 30° C. under anaerobic conditions with periodic agitation. The batter is then spread in thin layers and air dried at about 100° to 110° F. until it becomes dry enough to break into pieces. The temperature then can be increased to about 130° F. The data for fermented whey-malt flour products produced as described is given in table 1.

TABLE 1

| Run | Fermented Batter pH | Final Product pH | Lactic acid % | Finished moisture % |
|---|---|---|---|---|
| 1 |  | 3.95 | 3.47 |  |
| 2 | 3.90 | 4.05 | 3.58 | 10.5 |
| 3 | 3.85 | 4.05 | 3.54 |  |
| 4 | 3.85 | 4.05 | 3.64 |  |

EXAMPLE 2

Cheese whey, fresh from the vats, is allowed to ferment anaerobically at a temperature of 35° C. for 24 hours. The pH after this fermentation is between 3.5 and 3.8. A standard resazurin reduction test should indicate a complete reduction to white color within 5 minutes.

The fermented whey in the ratio of 9 parts by weight of whey to 10 parts by weight of malt flour is admixed therewith with one-half the malt flour being added 1 day after fermentation of the malt flour is started. The procedure of example 1 is then followed. Data for a fermented whey-malt flour product so produced is given in table 2 following.

TABLE 2

| Fermented Batter pH | Final Product pH | Lactic Acid % | Finished Moisture % |
|---|---|---|---|
| 3.65 | 3.50 | 5.70 | 5.9 |

Prefermentation of the whey thus leads to higher lactic acid production as shown by this data compared to that in table 1.

EXAMPLE 3

The procedure of example 1 is followed except 5 parts by weight of malt flour is used in admixture with 6 parts by weight of fresh whey, and the inclusion of calcium carbonate in the admixture in a concentration of about 10 percent by weight of the malt flour. The calcium carbonate buffers the admixture and allows a more efficient fermentation producing a much higher quantity of lactic acid as the calcium lactate salt.

After the fermentation, the batter is first treated with ortho phosphoric acid to neutralize the calcium carbonate and release the lactic acid from the calcium salt, and then dried. Data for fermented whey-malt flour products produced in this way is given in table 3.

TABLE 3

| Run[1] | Weight ratio malt flour/whey | pH | Lactic Acid % (colorimetric) | Moisture % |
|---|---|---|---|---|
| 5 (acidified) | 5/6 | 3.70 | 23.1 | 11.3 |
| 6 (acidified) | 5/6 | | 23.6 | |
| 7 (acidified) | 5/6 | | 21.0 | |
| 8 (unacidified) | 5/6 | | 16.3 | 7.7 |

[1] Acidified has reference to the use of phosphoric acid to free the lactic acid.

EXAMPLE 4

The same procedure of example 3 is followed with the whey, calcium carbonate and the phosphoric acid, but in addition to making samples using malt flour, samples are made using barley flour, wheat flour, and rye flour in the same proportions as the malt flour.

After 2 days of fermentation, it became quite obvious that the barley flour, the wheat flour, and the rye flour performed quite differently from the malt flour. All of the samples with these other flours developed off-colors and odors, due to other types of bacterial action. In some cases, the finished dried product showed appreciable lactic acid development, but even in these cases, the appearance, the flavor, and the aroma of the dried product was inferior to the product made from malt flour.

EXAMPLE 5

An inoculum is prepared by serial transfer from pure starter culture. A loopful of *Streptococcus diacetilactis* ATCC 11007 is transferred to 10 ml. of trypticase soy broth and incubated anaerobically for 24 hours at 30° C. The contents of this broth culture is transferred to a flask containing 1 liter of sterilized fresh whey and 0.3 percent yeast extract. After 48 hours of subsequent incubation it is used as final inoculum for 9 liters of prefermented sterilized whey.

The prefermented sterilized whey is prepared by fermenting fresh whey anaerobically for 24 hours at 33° C. followed by sterilization.

The inoculated whey is incubated at 30° C. for 48 hours and then mixed with malt flour in the ratio of 1 g. of malt flour to 1 ml. of cultured whey. Then calcium carbonate is added in a ratio of 1 part by weight to 10 parts of malt flour. The resulting batter is incubated at 30° C. for 72 hours anaerobically and then phosphoric acid added to neutralize the calcium carbonate and convert the calcium lactate to lactic acid. The batter is then dried as in example 1.

The resulting product contains about 15 to 40 percent lactic acid, the residues of the fermentation of malt flour and whey in admixture, the viable and nonviable cells of the fermenting organism and calcium phosphate. The product usually has a pH of 3.5 to 4.0, is light brown in color and somewhat hygroscopic, showing soft caking properties at normal room humidities It can have a finished moisture content usually of about 5 to 10 percent.

EXAMPLE 6

The use of other lactic fermenting cultures, besides those naturally present in whey, is shown to be feasible by incorporating different cultures in a malt wort medium and fermenting the medium in admixture with malt flour. Malt wort is the converted starch and dextrins from malt and gelatinized corn with about 12 percent sugar content. Calcium carbonate is added in the amount of 10 percent by weight of the malt flour. The liquid-to-flour ratio, fermentation conditions and drying used are the same as in examples 1 and 2. The organisms used and the lactic acid content of the resulting products are listed in table 5. Data is given for the products obtained with and without the use of phosphoric acid to acidify the product, neutralize calcium carbonate and convert calcium lactate to lactic acid.

TABLE 5

| Organism | % Lactate ion |
|---|---|
| *Lactobacillus acidophilus* unacidified | 21.4 |
| *Lactobacillus acidophilus* acidified | 20.3 |
| *Streptococcus lactis* unacidified | 21.2 |
| *Streptococcus lactis* acidified | 17.8 |
| *Pediococcus cerevisiae* unacidified | 18.8 |
| *Pediococcus cerevisiae* acidified | 18.2 |
| *Lactobacillus delbreuckii* unacidified | 20.3 |
| *Lactobacillus delbreuckii* acidified | 20.0 |
| *Lactobacillus plantarum* unacidified | 20.5 |
| *Lactobacillus plantarum* acidified | 20.8 |
| Buttermilk—wort inoculum unacidified | 19.3 |
| Buttermilk—wort inoculum acidified | 17.9 |

The flavor effects in a baked product taste test indicated that there were some differences apparent in the products of the fermentation of the whey-malt flour product as compared with the products of the fermentation of malt wort-malt flour by the specific organisms listed above. It was a matter of personal flavor preference as to which inoculum medium was better but generally the whey product was favored. The forementioned desirable dough softening and conditioning effect of the whey-malt flour product, however, is much less prevalent in the malt wort-malt flour inoculated products.

EXAMPLE 7

Samples of wheat flour containing, respectively, 0.5, 1.0, 1.5 and 2.0 percent by weight of the dried lactic fermented malt flour from example 3 were baked into bread using a regular commercial sponge and dough formula.

Taste panel results on the sliced bread showed improvement in bread flavor in direct proportion to the quantity of lactic fermented malt flour added. The flavor additive reduced the bread crumb pH without damaging the crumb appearance. The lactic fermented malt decreased sponge time, decreased the mixing time, and at levels up to 1.5 percent increased the loaf volume of the bread.

EXAMPLE 8

Fresh cheese whey is prefermented anaerobically at 30° C. for 24 hours.

To 6 parts by weight of the prefermented whey is added 5 parts by weight of malt flour and 1 part by weight of calcium carbonate. To determine the effect on lactate ion production the total amount of malt flour and calcium carbonate is added (a) all at once to the prefermented whey or (b) intermittently to the prefermented whey over a 5 day period in equal daily additions. The samples are kept at 30° C. under anaerobic conditions. All samples are fermented for a total of 6 days starting from the first addition of malt flour to the whey.

After the fermentation, the samples are acidified with 75 percent ortho phosphoric acid, using an amount calculated stoichiometrically to convert all added calcium carbonate to calcium phosphate and thereby convert lactate ions to lactate acid. The samples are dried in an oven at 110° F., milled and analyzed. The results are shown in table 6.

TABLE 6

| Sample | Method of Addition | Percent Lactate Ion Colorimetric | Titrable | Percent Moisture |
| --- | --- | --- | --- | --- |
| 1 | Intermittent | 28.0 | 28.6 | 11.2 |
| 2 | Intermittent | 26.5 | 23.4 | 12.0 |
| 3 | Batch | 19.5 | 11.1 | 14.4 |
| 4 | Batch | 11.0 | 15.9 | 10.2 |

These results show the intermittent addition of malt flour and calcium carbonate gives higher amounts of lactate ion in the product than does batch addition of these two materials.

EXAMPLE 9

Three liters of fresh cheese whey is prefermented for 24 hours at 30° C. under anaerobic conditions. Over the next 5 day period daily additions of 500 g. of malt flour and 100 g. of calcium carbonate are made. The sample is kept at 30° C. under anaerobic conditions between additions. After the fifth addition the sample is allowed to ferment for 48 hours at 30° C. under anaerobic conditions. To the sample is then added 75 percent ortho phosphoric acid in an amount stoichiometric to the amount of calcium carbonate added and the sample then blended in a mixer. The sample is spread on polyethylene shelves in an oven and a constant temperature of 110° F. is maintained until the sample is dried. The sample is then milled and analyzed.

A number of samples are prepared as described with the results set forth in table 7.

TABLE 7

| Sample | % Lactate ion Colorimetric | Titrable | % Moisture |
| --- | --- | --- | --- |
| 1 | 23.0 | 18.2 | 12.0 |
| 2 | 24.6 | 21.2 | 10.2 |
| 3 | 25.6 | 25.5 | 10.8 |
| 4 | 26.5 | 23.4 | 12.0 |
| 5 | 17.8 | 13.6 | 9.0 |
| 6 | 22.8 | 19.8 | 10.2 |

Various changes and modifications of the invention can be made and, to the extent that such variations incorporate the spirit of this invention, they are intended to be included within the scope of the appended claims.

What is claimed is:

1. A nutritious flavorsome dry powdered additive for use in starch-based foodstuffs to supply malt flavor and lactic sourness thereto comprising malt flour anaerobically fermented with a lactic acid producing micro-organism.

2. An additive according to claim 1 containing at least 10 percent by weight of lactate ions.

3. An additive according to claim 1 containing substantially all the metabolic products of the fermentation and the viable and nonviable micro-organisms produced in the fermentation.

4. A nutritious flavorsome dry powdered additive for use in starch-based foodstuffs to supply malt and lactic sourness thereto comprising the dried residue of a lactic acid producing micro-organism fermented mixture of whey with malt flour.

5. The process of producing a nutritious flavorsome additive for use in starch-based foodstuffs which comprises:
    anaerobically fermenting an aqueous dispersion of malt flour with a lactic acid producing micro-organism to form a lactic acid rich fermentate;
    removing water from the fermentate until it is dry; and
    grinding the dry product to a flour.

6. The process of claim 5 in which the malt flour is dispersed in whey.

7. The process of claim 5 in which a buffering agent is included in the aqueous dispersion during the fermentation.

8. The process of claim 7 in which the buffering agent forms a salt with lactic acid produced in the fermentation, and the fermentate is treated with an acid which is at least moderately strong following the fermentation to convert lactate salts to lactic acid.

9. The process of claim 8 in which the buffering agent is calcium carbonate and the acid which is at least moderately strong is phosphoric acid.

10. The process of claim 5 in which the fermentation continues until the lactate ion content in the dry product is at least 10 percent by weight.

11. The process of claim 7 in which buffering agent is added periodically to the fermenting dispersion.

12. The process of claim 11 in which malt flour is added periodically to the fermenting dispersion.

13. The process of claim 6 in which the whey is prefermented before malt flour is dispersed therein.

14. The process of claim 6 in which 1 part by weight of whey is fermented with 0.5 to 2 parts by weight of malt flour.

15. The process of claim 7 in which about 10 to 20 percent by weight of calcium carbonate is used based on the weight of malt flour.

16. The process of claim 5 in which 1 part of water is present per about 0.5 to 2 parts by weight of malt flour.

17. The process of claim 5 in which the fermentation continues for a minimum of 4 days.